(12) United States Patent
Gross et al.

(10) Patent No.: US 8,198,995 B2
(45) Date of Patent: Jun. 12, 2012

(54) METHODS AND SYSTEMS FOR AUTOMATED EMERGENCY LIGHTING

(75) Inventors: William Henry Gross, Erie, PA (US); Ronald David Bauerle, Erie, PA (US)

(73) Assignee: General Electric Company, Schenectady, NY (US)

(*) Notice: Subject to any disclaimer, the term of this patent is extended or adjusted under 35 U.S.C. 154(b) by 463 days.

(21) Appl. No.: 12/464,592

(22) Filed: May 12, 2009

(65) Prior Publication Data

US 2009/0278674 A1 Nov. 12, 2009

Related U.S. Application Data

(60) Provisional application No. 61/052,302, filed on May 12, 2008.

(51) Int. Cl.
*B60Q 1/50* (2006.01)
(52) U.S. Cl. .................. 340/467; 340/453; 340/438
(58) Field of Classification Search .................. 340/438, 340/452, 458, 463, 464, 467, 468, 471, 479, 340/453; 307/10.8; 246/187 B
See application file for complete search history.

(56) References Cited

U.S. PATENT DOCUMENTS

| | | | |
|---|---|---|---|
| 3,287,555 A * | 11/1966 | Livingston et al. | ....... 246/187 B |
| 3,528,056 A | 9/1970 | Voevodsky | |
| 4,074,226 A | 2/1978 | Takeda et al. | |
| 4,107,647 A * | 8/1978 | Yoshino | ......... 340/467 |
| 4,723,078 A | 2/1988 | Neuffer et al. | |
| 5,394,137 A | 2/1995 | Orschek | |
| 5,404,130 A | 4/1995 | Lee et al. | |
| 5,629,670 A | 5/1997 | Pabla et al. | |
| 5,644,290 A * | 7/1997 | Rhodes | ......... 340/468 |
| 5,770,999 A * | 6/1998 | Rhodes | ......... 340/468 |
| 5,815,073 A | 9/1998 | Gomez et al. | |
| 6,014,600 A | 1/2000 | Ferri et al. | |
| 6,020,814 A * | 2/2000 | Robert | ......... 340/467 |
| 6,278,364 B1 * | 8/2001 | Robert | ......... 340/467 |
| H2001 H * | 11/2001 | Pinkus | ......... 340/479 |
| 6,563,428 B1 | 5/2003 | Maley, Sr. | |
| 6,879,251 B2 | 4/2005 | Robbins et al. | |
| 7,307,518 B2 | 12/2007 | Bogos | |

* cited by examiner

*Primary Examiner* — Van T. Trieu
(74) *Attorney, Agent, or Firm* — GE Global Patent Operation; John A. Kramer

(57) ABSTRACT

A control circuit for activating at least one emergency light when a vehicle's brakes are applied is described. The control circuit includes a pressure switch configured to selectively couple a power source and an electronically-operated actuator to facilitate selectively energizing the electronically-operated actuator. The electronically-operated actuator includes at least one contact set configured to couple the power source to the at least one emergency light when the electronically-operated actuator is not energized. The control circuit also includes a manual reset circuit coupled to the pressure switch and to the electronically-operated actuator. The manual reset circuit configured to facilitate energizing the electronically-operated actuator upon receipt of an operator input.

16 Claims, 6 Drawing Sheets

METHODS AND SYSTEMS FOR AUTOMATED EMERGENCY LIGHTING

CROSS-REFERENCE TO RELATED APPLICATION

This application claims the benefit of U.S. Provisional Application No. 61/052,302, filed May 12, 2008.

BACKGROUND OF THE INVENTION

Certain embodiments of the present invention relate generally to automated railroad operation or other vehicle operation. Certain embodiments relate to methods and systems for automatically activating emergency lights during operation of a vehicle.

At least some known locomotives include an emergency lighting system that provides egress lighting to locomotive passengers and/or emergency workers upon application of the emergency brakes. To activate such emergency lighting systems, at least some known locomotives include a brake master controller and/or a locomotive computer (CMU) that communicates a signal to the lighting system. However, when the brake master controller and/or the CMU are not functional, such as when the locomotive is not providing power, the emergency lighting system may not be able to receive the signal to activate the emergency lights.

Further, in at least some known instances, power to the emergency lighting system may be provided by a back-up power source or a locomotive battery. As such, in at least some instances, it may be desired that the emergency lighting system be deactivated in order to conserve energy from the back-up power source or locomotive battery when additional lighting is not necessary.

BRIEF DESCRIPTION OF THE INVENTION

In one aspect, an emergency lighting control circuit for a vehicle is provided. The control circuit includes a pressure switch configured to selectively couple a power source and an electronically-operated actuator to facilitate selectively energizing the electronically-operated actuator. The electronically-operated actuator includes at least one contact set configured to couple the power source to at least one emergency light when the electronically-operated actuator is not energized. The control circuit also includes a manual reset circuit coupled to the pressure switch and to the electronically-operated actuator. The manual reset circuit is configured to facilitate energizing the electronically-operated actuator upon receipt of an operator input.

In another aspect, an emergency lighting system for a vehicle is provided. The emergency lighting system includes a power source, an electronically-operated actuator, and one or more emergency lights. The emergency lighting system also includes a pressure switch configured to selectively couple the power source and the electronically-operated actuator based on a brake pressure level (e.g., the pressure level in a brake pipe) to facilitate selectively energizing the electronically-operated actuator. The electronically-operated actuator is configured to couple the power source and the one or more emergency lights when the electronically-operated actuator is not energized. The emergency lighting system also includes a manual reset circuit configured to selectively couple the pressure switch and the electronically-operated actuator. The manual reset circuit is configured to facilitate energizing the electronically-operated actuator upon receipt of an operator input.

In yet another aspect, a method for controlling emergency lighting in a vehicle is provided. The method includes sensing application of an emergency brake of the vehicle by measuring a pressure associated with the emergency brake and automatically energizing at least one emergency light upon sensing application of the vehicle's emergency brake. The method also includes discontinuing a supply of power provided to the at least one emergency light upon at least one of release of the vehicle's emergency brake and receipt of a manual reset input.

DETAILED DESCRIPTION OF THE INVENTION

Many specific details of certain embodiments of the invention are set forth in the following description in order to provide a thorough understanding of such embodiments. One skilled in the art, however, will understand that the present invention may have additional embodiments, or that the present invention may be practiced without several of the details described in the following description.

Moreover, as used herein, the term "locomotive" may include any car and/or engine configured for use on a railroad, and may also be called a "railcar," an "engine," or a "freight car." A locomotive as described herein is intended as exemplary only, and is thus not intended to limit in any way the definition and/or meaning of the term "locomotive." Furthermore, although the invention is described in association with a railroad and locomotives, it should be understood that the present invention is applicable to other modes of transportation and, in fact, is applicable to any device and/or apparatus (e.g., vehicles other than locomotives) for which an emergency lighting system may be used.

Figure 1:
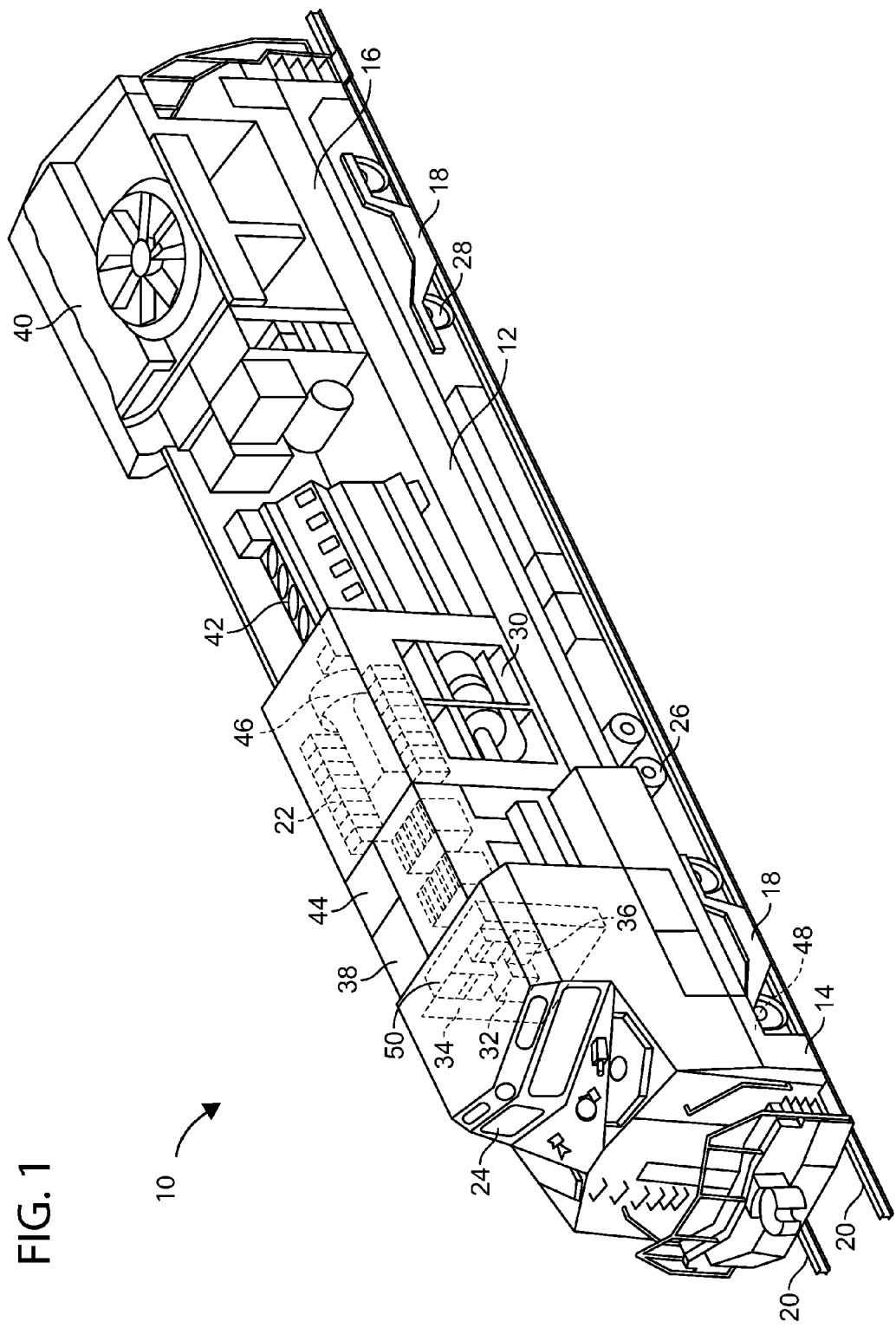
FIG. 1 is a partial cut away view of an exemplary locomotive.

FIG. 1 is a partial cut away view of an exemplary locomotive 10. In the exemplary embodiment, locomotive 10 includes a platform 12 having a first end 14 and an opposite second end 16. Moreover, in the exemplary embodiment, a propulsion system 18, or truck, is coupled to platform 12 for supporting, and propelling platform 12 on a pair of rails 20. An equipment compartment 22 and an operator cab 24 extend from platform 12. An air brake system 26 provides compressed air to locomotive 10 for use in actuating a plurality of air brakes 28 on locomotive 10 and railcars (not shown) behind it. An auxiliary alternator system 30 supplies power to auxiliary equipment, and an intra-consist communications system 32 collects, distributes, and displays consist data across all locomotives 10 included in a consist.

A cab signal system 34 couples a wayside unit (not shown) to a train control system 36. In particular, in the exemplary embodiment, system 34 receives coded signals from a pair of rails 20 through track receivers (not shown) located on the front and rear of the locomotive 10. Information received conveys the speed limit and operating mode to the operator of locomotive 10. A distributed power control system 38 enables remote control operation of multiple locomotives 10 coupled in the consist. System 38 also provides for control of tractive power in motoring and braking, as well as control of air brakes 28.

An engine cooling system 40 facilitates maintaining an operating temperature of engine 42 and other components below a pre-determined temperature. In addition, cooling system 40 also facilitates minimizing engine thermal cycling by maintaining an optimal engine temperature throughout the operating load range, and thus reducing overheating in tunnels. An equipment ventilation system 44 provides additional cooling to equipment within locomotive 10.

A traction alternator system 46 converts mechanical power to electrical power that is then supplied to propulsion system 18. Propulsion system 18 enables locomotive 10 to move, and in the exemplary embodiment includes at least one traction motor 48 and dynamic braking capability. In particular, the propulsion system 18 receives power from traction alternator 46, and through traction motors 48 moves locomotive 10. Further, in the exemplary embodiment, locomotive 10 includes an emergency lighting system 50 that is configured to activate at least one emergency light 51 when brakes 28 are activated in an emergency situation. In an exemplary embodiment, the at least one emergency light 51 includes an emergency brake light positioned within operator cab 24 to illuminate an exit door and/or a path to the exit door. In some embodiments, emergency brake lights 51 are provided that illuminate an exit path from each passenger seat to each exit door, and may also be provided outside of locomotive 10 to, for example, illuminate exit steps.

Locomotive 10 also includes a signaling system that includes a horn 52 and a bell 54 for signaling to persons outside of operator cab 24. Horn 52 and bell 54 are used at specific times during transit operations, such as approaching grades or crossings to warn of the locomotive's approach. A wireless data preservation programming and management system is carried on-board locomotive 10. Data preservation programming and management system includes an antenna configured to transmit and receive signals between locomotive 10 and off-board communications devices through, for example, but not limited to, an 802.11g link, a satellite link, a UHF link, and/or a VHF link. Data preservation programming and management system also may include a video camera configured to acquire video and/or audio data from an external environment of locomotive 10.

Figure 2:
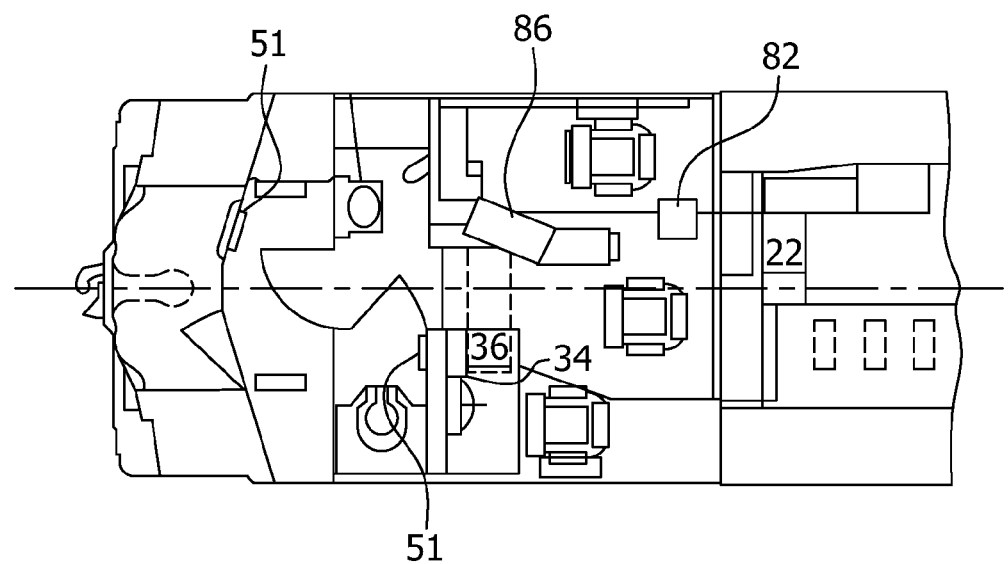
FIG. 2 is a top view of the locomotive shown in FIG. 1.
Figure 3:
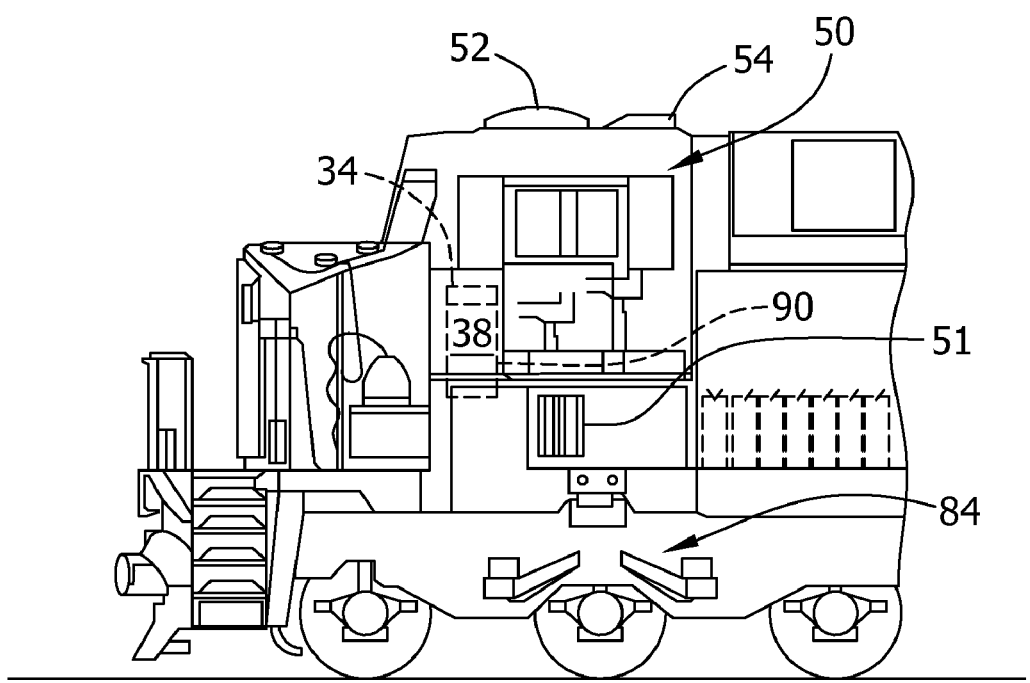
FIG. 3 is a side view of the locomotive shown in FIG. 1.

FIG. 2 is a top view of locomotive 10 (shown in FIG. 1). FIG. 3 is a side view of locomotive 10 (shown in FIG. 1). In the exemplary embodiment, emergency lighting system 50 (shown in FIG. 1) includes a circuit breaker 82, a brake pressure switch 84, at least one emergency light 51 (also shown in FIG. 1), and a manual reset device 86 (e.g., a manual reset circuit) that includes a manual reset switch 88 and an electrically-operated actuator 90 (e.g., a relay and/or a solenoid switch).

Figure 4:
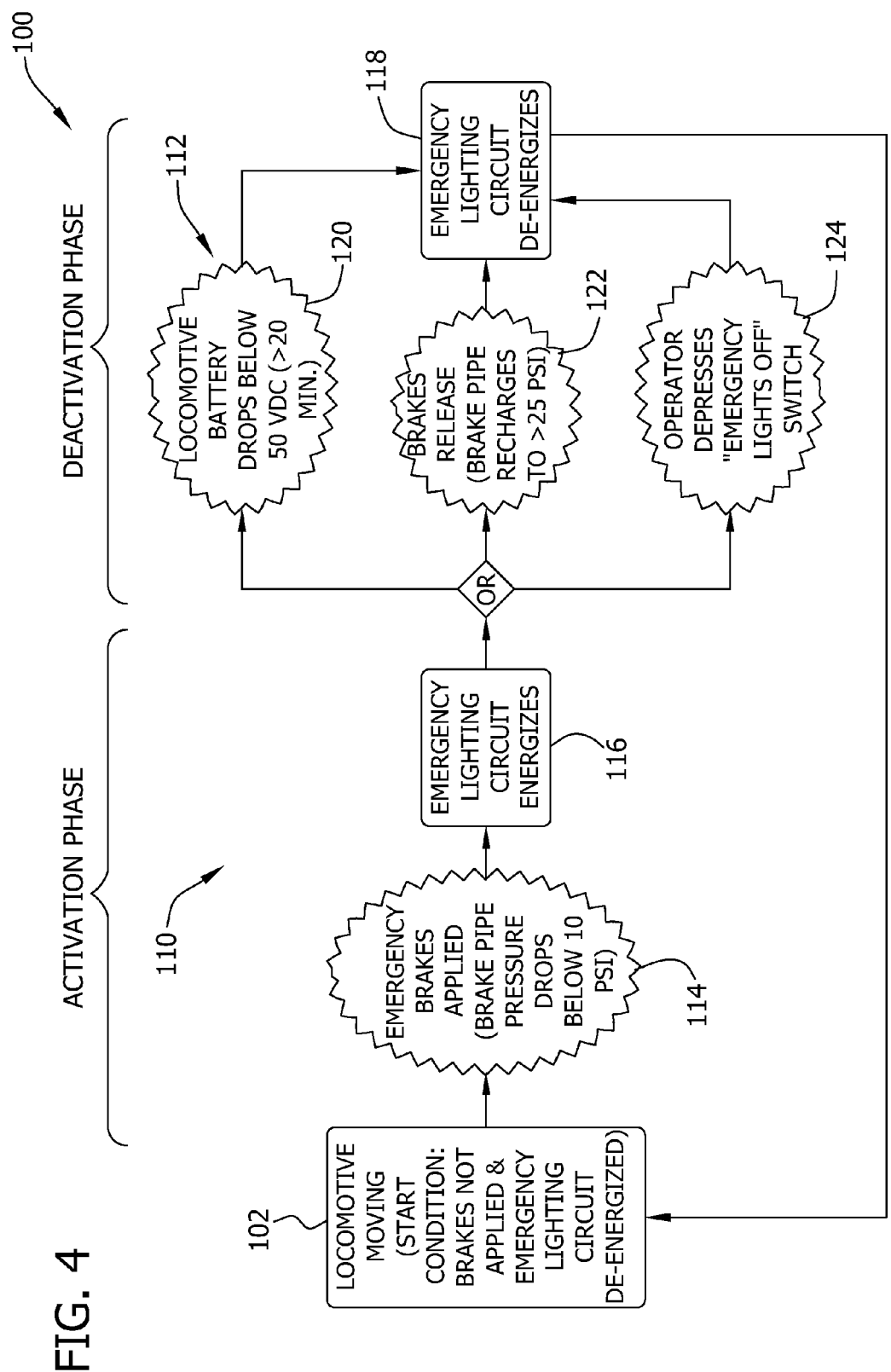
FIG. 4 is a flow chart of an exemplary method for controlling an emergency lighting system.

FIG. 4 is a flow chart of an exemplary method 100 for controlling an emergency lighting system, for example, emergency lighting system 50 (shown in FIG. 1). In an exemplary embodiment, emergency lighting system 50 includes at least one emergency light, for example, emergency lights 51 (shown in FIG. 1). Method 100 includes a start condition 102 wherein emergency lights 51 are not activated (i.e., emergency lights are not lit). Typically, in start condition 102, a locomotive, for example, locomotive 10 (shown in FIG. 1) is in motion and air brakes 28 (shown in FIG. 1) are not applied. In the exemplary embodiment, method 100 includes an activating phase 110 and a deactivating phase 112. Activating phase 110 includes sensing 114 an emergency application of brakes 28 and energizing 116 emergency lights 51. For example, activating phase 110 may include sensing 114 that brakes 28 (shown in FIG. 1) are applied and energizing 116 emergency lights 51 to illuminate exit paths when emergency brakes 28 are applied, as described above. In an exemplary embodiment, emergency application of brakes 28 is sensed 114 by measuring a brake pipe pressure. For example, emergency application of brakes 28 may be sensed 114 when the brake pipe pressure drops below a predetermined pressure level. In one specific embodiment, application of brakes 28 is sensed 114 when the brake pipe pressure drops below ten pounds per square inch (10 psi).

In other words, to increase visibility in an emergency situation, emergency lights 51 are energized 116, illuminating emergency lights 51. In an exemplary embodiment, deactivating phase 112 facilitates resetting emergency lighting system 50, and therefore, discontinuing 118 a supply of power provided to emergency lights 51 (i.e., turning-off the emergency lights). In an exemplary embodiment, deactivating phase 112 includes monitoring 120 a battery power level, sensing 122 that brakes 28 have been released, and receiving 124 a manual reset input. In the exemplary embodiment, discontinuing 118 is performed upon the occurrence of at least one of three events. For example, the three events may include a reduction in a battery power level (e.g., the battery's power level dropping below a power level sufficient for operation of emergency lights 51), release of brakes 28, and a manual reset of emergency lighting system 50 by the operator of locomotive 10.

In an exemplary embodiment, illumination provided by emergency lights 51 is discontinued 118 when the battery power level drops below a voltage threshold required for emergency lights 51 to function. In an alternative embodiment, power provided to emergency lights 51 is discontinued 118 when the monitored battery power level is below a predetermined level for a predetermined length of time. For example, power may be discontinued 118 when the monitored 120 battery power level is below 60% of a rated battery maximum power level for at least twenty minutes. More specifically, power to emergency lights 51 may be discontinued 118 when the monitored 120 battery power level is below fifty volts direct current (50 VDC) for at least twenty minutes. Deactivating 112 emergency lights 51 when a battery power level is reduced a predetermined amount facilitates preventing emergency lights 51 from removing all of the stored energy from the battery.

In an exemplary embodiment, power provided to emergency lights 51 is discontinued 118 when brakes 28 are no longer applied. In some embodiments, emergency lighting system 50 senses 122 that emergency brakes 28 have been released when a measured brake pipe pressure increases to a predetermined pressure level. For example, emergency lighting system 50 senses 122 that brakes 28 have been released when the measured brake pipe pressure increases to twenty-five pounds per square inch (25 psi) or above.

In an exemplary embodiment, power provided to emergency lights 51 is discontinued 118 upon receipt 124 of a manual reset input. For example, manual reset switch 84 (shown in FIG. 2) may be provided to an operator of locomotive 10. The emergency lighting system 50 receives 124 a manual reset input from manual reset switch 84 when the operator chooses to manually discontinue 118 providing power to emergency lights 51. The operator may decide to deactivate emergency lights 51 when emergency lighting is not necessary, for example, if emergency brakes 28 are applied and it is daytime. If it is bright outside, emergency lights 51 may not increase visibility of exit paths and/or exits compared to the illumination provided by sunshine. Furthermore, the operator may decide to deactivate emergency lights 51 if emergency lighting system 50 activates emergency lights 51 during a non-emergency. Upon detection of at least one of the deactivating 112 events, emergency lighting system 50 returns to start condition 102.

Figure 5:
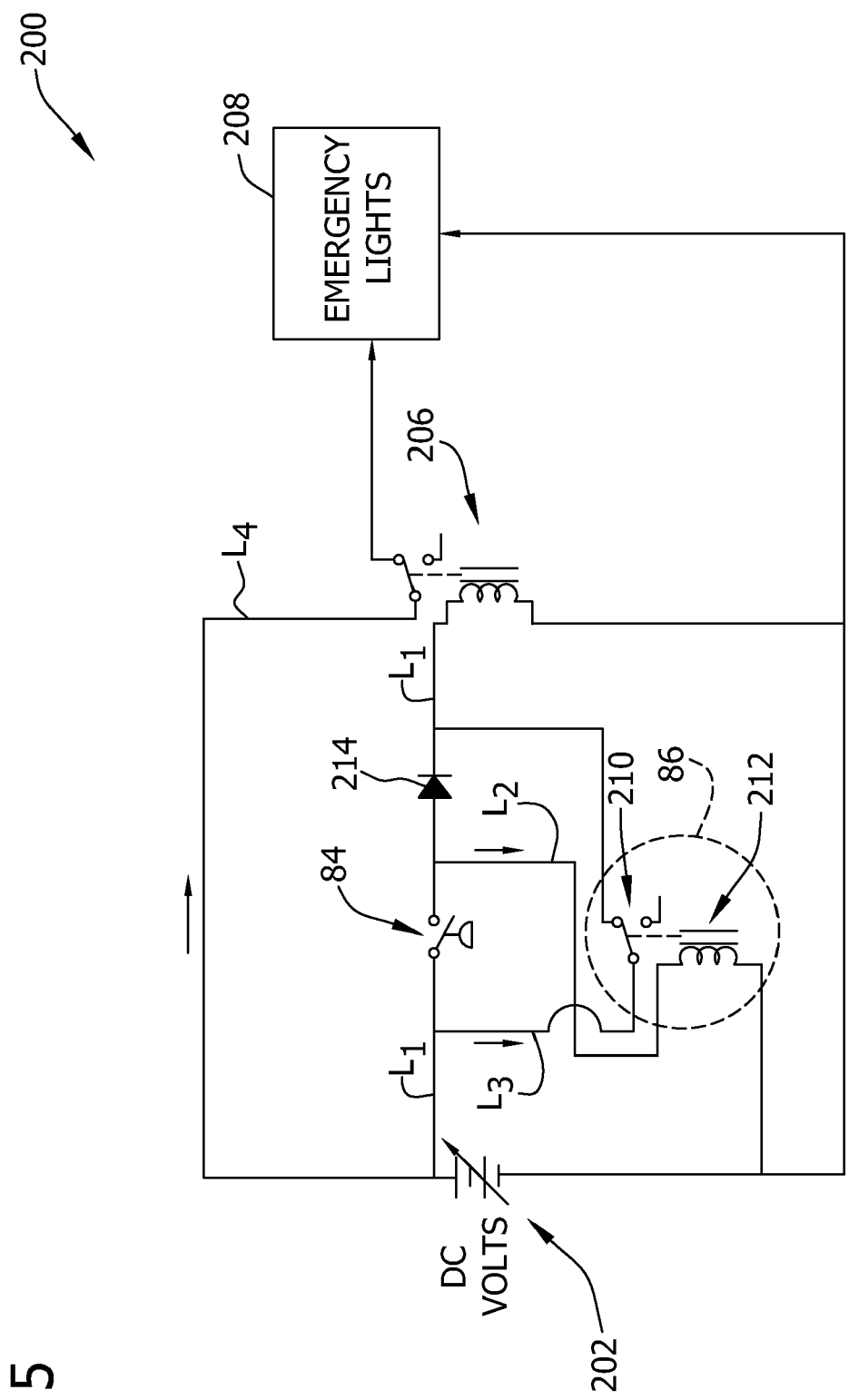
FIG. 5 is a schematic view of an exemplary circuit for an emergency lighting system, for example, the emergency lighting system shown in FIG. 1.

FIG. 5 is a schematic view of an exemplary circuit 200 of an emergency lighting system, for example, emergency lighting system 50 (shown in FIG. 1), for use within a vehicle, such as locomotive 10 (shown in FIG. 1). Although, circuit 200 is described with respect to a locomotive, as will be appreciated by one of ordinary skill in the art, circuit 200 may be used with any vehicle that is required to activate an emergency lighting system upon activation of a brake system.

In an exemplary embodiment, circuit 200 includes a battery 202 that provides current via a line $L_1$ to a pressure switch, for example, brake pipe pressure switch 84 (also shown in FIG. 3). Brake pipe pressure switch 84 is coupled to and communicates with a brake pipe (not shown) of air brake 28 (shown in FIG. 1). In the exemplary embodiment, switch 84 is a pressure switch that opens or closes based on pressure changes in air brake 28. In an alternative embodiment, switch 84 may be any switch that opens and closes based on a measured property of air brake 28. As used herein, unless otherwise specified, a "pressure switch" is any switch that opens and closes based on a measured property of brake 28. For example, as described above, a measured property of an air brake may be an air pressure level and/or a hydraulic fluid pressure level. In another example, a measured property of an electronic brake may be a current level, wherein a current level above, or absence of a current, may indicate an application of an emergency brake. Further, in an alternative embodiment, battery 202 may be any suitable source of power.

In the exemplary embodiment, circuit 200 includes an electrically-operated actuator, for example, a solenoid switch 206. In the exemplary embodiment, solenoid switch 206 is electrically coupled to pressure switch 84 via line $L_1$. Although described herein as a solenoid switch, an electrically-operated actuator may be a solenoid switch, a relay, or any suitable switch that enables circuit 200 to operate as described in more detail below. Solenoid switch 206, in the exemplary embodiment, is electrically coupled to emergency lights 208 such that the closing/de-energizing or opening/energizing of solenoid switch 206 activates or deactivates emergency lights 208.

In the exemplary embodiment, circuit 200 also includes a line $L_2$ that is electrically coupled between pressure switch 84 and a manual reset circuit, for example, manual reset device 86 (also shown in FIG. 2). Manual reset device 86 includes a manual reset switch 210 and a solenoid 212. Solenoid 212 is electrically coupled to pressure switch 84, such that solenoid 212 receives a current through pressure switch 84 when pressure switch 84 is in a closed position. Further, in the exemplary embodiment, circuit 200 includes a line $L_3$, also called a bypass line, that is electrically coupled between battery 202 and solenoid switch 206 such that a current may flow from battery 202 to solenoid switch 206 when manual reset switch 210 is engaged by an operator. In the exemplary embodiment, manual reset switch 210 is a momentary switch, for example, a push-button momentary switch or a toggle-type momentary switch. In an alternative embodiment, however, manual reset switch 210 may be any switch that enables circuit 200 to operate as described in more detail below. In addition, in the exemplary embodiment, circuit 200 includes a line $L_4$ that is electrically coupled between battery 202 and emergency lights 208. In the exemplary embodiment, a diode 214 is positioned within $L_1$. Diode 214 facilitates preventing current flowing through $L_3$ from being applied to solenoid switch 212 via $L_2$. Such current may interfere with the activation of manual reset device 86.

During operation, in the exemplary embodiment, battery 202 provides a current to pressure switch 84 that is coupled to and communicates with the brake pipe (not shown) of air brake 28. When the pressure in the brake pipe is at or above a predetermined level, thus indicating that the emergency brake system has not been activated, pressure switch 84 is in a closed position. Accordingly, a portion of the current that is provided by battery 202 is transferred through the closed circuit along line $L_1$ and to solenoid switch 206. Solenoid switch 206 maintains an open circuit position when receiving current from battery 202 such that emergency lights 208 are not activated. Further, when pressure switch 84 is in a closed position, a portion of the current that is provided by battery 202 is transferred through line $L_2$ to solenoid 212 such that solenoid 212 maintains an open circuit position. More specifically, providing a current to solenoid 212 creates an open circuit along line $L_3$.

When brake 28 is activated in an emergency situation, the pressure in the brake pipe drops below a predetermined level and pressure switch 84 moves from a closed circuit position to an open circuit position. Accordingly, an open circuit along line $L_1$ is created between battery 202 and solenoid switch 206. The lack of current provided to solenoid switch 206 causes solenoid switch 206 to move from an open position to a closed position, thus closing the circuit along line $L_4$ and activating emergency lights 208. When the pressure in the brake pipe increases above a predetermined level, indicating a recovery of the brake system, pressure switch 84 moves from an open circuit position to a closed circuit position, current flows through line $L_1$ to solenoid switch 206, and emergency lights 208 are deactivated.

In at least some instances, however, it may be desired to deactivate emergency lights 208 prior to the recovery of the brake system. Accordingly, manual reset device 86, as described above, provides a means to deactivate emergency lights 208 manually. Upon manually closing reset switch 210, solenoid 212 moves from an open circuit position to a closed circuit position and creates a closed circuit along line $L_3$. Accordingly, current supplied from battery 202 is provided to solenoid switch 206. Solenoid switch 206 moves from a closed position to an open position, creates an open circuit along line $L_4$, and deactivates emergency lights 208.

Further, as described above, when the pressure in the brake pipe rises above a predetermined level, pressure switch 84 moves from the open circuit position back to the closed circuit position, thus closing the circuit along line $L_1$ between battery 202 and solenoid switch 206. Current is again supplied through line $L_1$ to solenoid switch 206 and through line $L_2$ to solenoid 212. Accordingly, solenoid 212 is held in an open circuit position, an open circuit is created along line $L_3$, and thus, manual reset device 86 is ready for a subsequent use.

Figure 6:
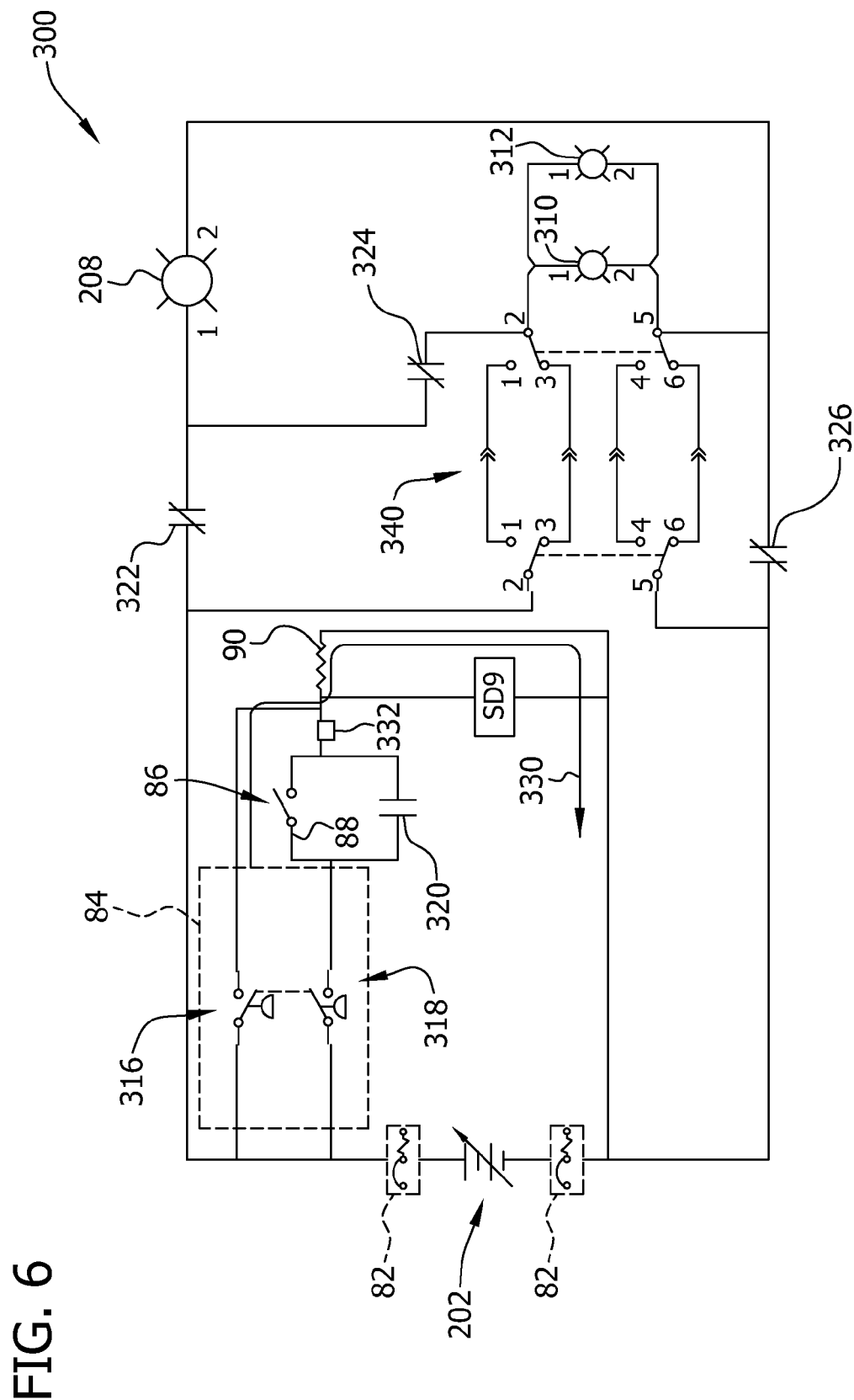
FIG. 6 is a schematic view of an alternative circuit for an emergency lighting system, for example, the emergency lighting system shown in FIG. 1.

FIG. 6 is a schematic view of an alternative embodiment of a control circuit 300. Control circuit 300 may be included within an emergency lighting system, for example, emergency lighting system 50 (shown in FIG. 1) for use within a vehicle, such as locomotive 10 (shown in FIG. 1). Circuit 300 facilitates controlling other locomotive lights, for example, auxiliary lights such as alcove and/or vestibule dome lights 310 and 312 in addition to emergency lights 208. Alcove and/or vestibule dome lights 310 and 312 may be used for normal (e.g., non-emergency) illumination in addition to emergency lighting. For example, alcove and/or vestibule dome lights 310 and 312 and emergency lights 208 may be positioned within operator cab 24 or on locomotive 10 as emergency lights 51 are shown in FIG. 1. As described above, emergency lighting system 50 includes circuit breaker 82, manual reset device 86, brake pressure switch 84, and electrically-operated actuator 90 (also shown in FIG. 3). Electronically-operated actuator 90 may be a solenoid switch, a relay, or any suitable switch that enables circuit 300 to operate as described herein. Brake pressure switch 84 includes a first electrical connection 316 and a second electrical connection 318. For example, brake pressure switch 84 may be configured such that first electrical connection 316 closes when the brake pressure is greater than twenty-five pounds per square inch (25 psi) and opens when the brake pressure is less than ten pounds per square inch (10 psi). Brake pressure switch 84 may also be configured such that second electrical connection 318 closes when the brake pressure is less than 10 psi and opens when the brake pressure is greater than 25 psi. Pressure switch 84 may include multiple independent pressure switches, or alternatively, may include a single pressure switch containing multiple sets of electrical contacts.

In some embodiments, relay 90 includes multiple contact sets, for example, a first relay contact set 320, a second relay contact set 322, a third relay contact set 324, and a fourth relay contact set 326. Each relay contact set 320, 322, 324, and 326 is coupled within circuit 300 in either a normally open (NO) position or a normally closed (NC) position. When relay 90 is not energized, first relay contact set 320 is open and second, third, and fourth contact sets 322, 324, and 326 are closed. Coupling contact sets 320, 322, 324, and 326 in this manner facilitates lighting of emergency lights 208 when relay 90 is not energized, which provides a level of fault tolerance with respect to operation of circuit 300.

In operation, brake pipe pressure switch 84 determines when emergency braking is applied. For example, when brake pipe pressure switch 84 determines that a brake pipe pressure is less than 10 psi, first electrical connection 316 opens, relay 90 is not energized, and therefore, relay contact sets 320, 322, 324, and 326 are in non-energized states (e.g., contact set 320 is open and contact sets 322, 324, and 326 are closed). Electricity flows from battery 202, through second relay contact set 322, energizes emergency lights 208, and through fourth contact set 326 to complete a circuit. Third contact set 324 is closed, which allows electricity to flow through third contact set 324 to auxiliary lights 310 and 3 12.

When brake pipe pressure switch 84 determines that the brake pipe pressure level has increased, for example, from below 10 psi to above 25 psi, first brake pipe electrical connection 316 closes and second brake pipe electrical connection 318 opens. In some embodiments, relay 90 is energized, closing first contact set 320 and opening second, third, and fourth contact sets 322, 324, and 326. Electricity flows through first brake pipe electrical connection 316 to relay 86 and an emergency light bypass circuit 330 is completed. Open second contact set 322 prevents electricity from reaching emergency lights 208, and therefore, emergency lights 208 are not lit.

As described above, when brake pipe pressure switch 84 determines that the brake pipe pressure level is below, for example, 10 psi, first electrical connection 316 opens and second electrical connection 318 closes. In an exemplary embodiment, manual reset switch 88 is included within manual reset device 86. In an exemplary embodiment, reset device 86 includes reset switch 88 and first relay contact set 320. Reset device 86 allows an operator of locomotive 10 to turn off emergency lights 208 even though pressure switch 84 indicates that brakes 28 are being applied. For example, reset switch 88 may activate a latch circuit to bypass first electrical connection 316 and energize relay 90. In other words, second electrical connection 318 is closed when the brake pipe pressure level is below 10 psi. Closing reset switch 88 enables electricity to flow through second electrical connection 318 from battery 202 and to energize relay 90. Energizing relay 90 opens second, third, and fourth contact sets 322, 324, and 326, which turns off emergency lights 208. Energizing relay 90 also closes first contact set 320, which couples second electrical connection 318 to relay 90 to maintain current flow to relay 90 when reset switch 88 is released (i.e., opened). Furthermore, circuit 300 may include a delay device 332 to enable circuit 300 to function as described herein. For example, when relay 90 de-energizes due to pressure switch 84 changing state, second electrical connection 318 may close before relay 90 de-energizes and opens first contact set 320. This may allow relay 90 to re-energize and not light emergency lights 208. Delay device 332 delays significant current flow through relay 90 for a predetermined time period sufficient to allow relay 90 to de-energize. If the operator subsequently wants to override the illumination of emergency lights 208, the operator presses reset switch 88 for a time period greater than the predetermined delay, which allows first contact set 320 to latch itself on.

Control circuit 300 may also include a three-way switch 340. In some embodiments, three-way switch 340 is positioned within operator cab 24. Three-way switch 340 enables operator control of auxiliary lights 310 and 312. Control circuit 300 facilitates independently controlling alcove and/or vestibule dome lights 310 and 312 when there is no detected emergency, and overriding the independent control during an emergency to activate lights 310 and 312 regardless of the position of three-way switch 340. As described above, upon a determination that brakes 28 have been applied, relay 90 is de-energized, and contact sets 322, 324, and 326 move to a closed position, which allows current to flow from battery 202 to emergency lights 208 and auxiliary lights 310 and 312. Three-way switch 340 facilitates activating auxiliary lights 310 and 312 when emergency lights 208 are not activated. In the exemplary embodiment, auxiliary lights 310 and 312 are lit whenever emergency lights 208 are lit, and additionally, auxiliary lights 310 and 312 may be lit when emergency lights 208 are not lit. By activating auxiliary lights 310 and 312 upon a determination that brakes 28 have been applied, an additional level of safety, due to increased illumination and therefore, potentially an increase in visibility, is provided.

The methods and systems described herein relate to an emergency lighting system for a vehicle. The emergency lighting system may include a power source, an electrically-operable actuator, a pressure switch, a manual reset circuit, and an emergency light. The electrically-operable actuator is a switch whose state (e.g., "on" or "off") is controllable by applying an electrical signal to the switch. Examples include a relay, a solenoid circuit, solid-state circuits, or the like. The pressure switch is configured to selectively couple the power source and the electrically-operable actuator, for example, based on a property of a measured property of a vehicle's brakes, such as the pressure level of an air brake line or other brake component in the vehicle. The electrically-operable actuator transitions to a first state (e.g., an "on" state) when coupled to the power source. The electrically-operable actuator is configured to couple the power source with an emergency light, for energizing the emergency light, when the electrically-operable actuator is in one of the first state or a second, different state (e.g., an "off" state) and to de-couple the power source from the emergency light when the electrically-operable actuator is in the other of the first state or the second state. Upon receipt of an operator input, the manual reset circuit facilitates control of the electrically-operable actuator to the state of the electrically-operable actuator where the power source is de-coupled from the emergency light (i.e., the "other" of the first state or the second state), thereby deactivating or de-energizing the emergency light. The term "transitions," unless otherwise specified, means changing from one state to another or remaining in a particular state.

The above-described methods and systems for automatically activating an emergency lighting system are cost-effective and highly reliable. The system permits automatically activating an emergency lighting system when brakes on a locomotive are applied in an emergency situation. By utilizing a mechanical property of the locomotive brakes, for example, the pressure in the brake pipe, the emergency lighting system is able to be activated without user input. The manual reset circuit, including the bypass line, facilitates the manual deactivation of the emergency lights prior to the recovery of the brake system. Accordingly, the methods and systems described herein facilitate operation of an emergency lighting system in a cost-effective and reliable manner. Further, the design of the bypass circuit prevents the manual reset from persisting after the locomotive brake pipe pressure has risen above the predetermined level, therefore enabling the circuit to react to the next emergency brake event. In addition, the circuit facilitates the "fail-safe" characteristic of the emergency lighting system in that a break or failure in line $L_1$ or a failure of solenoid switch 206 will activate the emergency lights. Moreover, the system facilitates increasing the reliability of the activation of the emergency lights because of the self-containment of the circuit within each locomotive or car. Accordingly, the system does not rely on other locomotives or cars in the consist for notification of an emergency brake event.

Exemplary embodiments of circuits for use in an emergency lighting system are described above in detail. The methods and systems are not limited to the specific embodiments described herein nor to the specific illustrated circuit and steps of operating the circuit, but rather, steps of the method and/or components of the system may be utilized independently and separately from other steps and/or components described herein. Further, the described method steps and/or system components can also be defined in, or used in combination with, other methods and/or systems, and are not limited to practice with only the method and system described herein. The description above is meant to cover a specific example of the general circuit for use with an emergency lighting system and should not be found limited to the specific embodiment described.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit comprising:
    a pressure switch configured to selectively couple a power source and an electronically-operated actuator to selectively energize said electronically-operated actuator, said electronically-operated actuator comprising at least one contact set configured to couple said power source to at least one emergency light when said electronically-operated actuator is de-energized, wherein said pressure switch is coupled to a brake and configured to measure a brake pressure level; and
    a manual reset device coupled to said pressure switch and to said electronically-operated actuator, said manual reset circuit configured to energize said electronically-operated actuator upon receipt of an operator input;
    wherein said pressure switch comprises a first electrical connection and a second electrical connection, said first electrical connection selectively coupling said power source to said electronically-operated actuator and said second electrical connection selectively coupling said power source to said manual reset device, said pressure switch further configured to:
        open said first electrical connection when the brake pressure level is less than a first predetermined level and close said second electrical connection when the brake pressure level is less than the first predetermined level, the first predetermined level corresponding to an applied emergency brake; and
        close said first electrical connection when the brake pressure level is greater than a second predetermined level that corresponds to a non-applied emergency brake.

2. The circuit of claim 1 wherein said at least one emergency light is activated when said electronically-operated actuator is de-energized.

3. The circuit of claim 1 wherein said electronically-operated actuator comprises a plurality of contact sets, each of said plurality of contact sets positioned in a first state when said electronically-operated actuator is energized and positioned in a second state when said electronically-operated actuator is de-energized, said first state and said second state include one of an open state and a closed state.

4. The circuit of claim 1 wherein said manual reset device comprises a manual reset switch that is open unless manually closed by an operator, and wherein said first electrical connection bypasses said manual reset device to couple said power source to said electronically-operated actuator.

5. The circuit of claim 4 wherein said open first electrical connection and said open manual reset switch prevent current from flowing from said power source to said electronically-operated actuator when the brake pressure level is below the first predetermined level that corresponds to an applied emergency brake.

6. The circuit of claim 4 wherein said closed second electrical connection and said manually closed reset switch facilitate current flow from said power source to said electronically-operated actuator, wherein energizing said electronically-operated actuator deactivates said at least one emergency light and resets said control circuit.

7. The circuit of claim 1 further comprising a delay device coupled to said manual reset device, said delay device configured to delay current flow through said electronically-operated actuator for a predetermined time period to de-energize said electronically-operated actuator.

8. The circuit of claim 1 further comprising at least one auxiliary light that is automatically activated when said electronically-operated actuator is de-energized.

9. The circuit of claim 8 further comprising a three-way switch configured to manually deactivate said at least one auxiliary light.

10. A system comprising:
    a power source;
    an electronically-operated actuator;

one or more emergency lights;

a pressure switch configured to selectively couple said power source and said electronically-operated actuator based on a brake pressure level to selectively energize said electronically-operated actuator, said electronically-operated actuator configured to couple said power source and said one or more emergency lights when said electronically-operated actuator is de-energized, wherein said pressure switch couples said power source and said electronically-operated actuator when the brake pressure level corresponds to a non-applied emergency brake; and a manual reset device configured to selectively couple said pressure switch and said electronically-operated actuator, said manual reset device configured to energize said electronically-operated actuator upon receipt of an operator input.

11. The system of claim 10 wherein said pressure switch prevents current from flowing from said power source to said electronically-operated actuator when said measured brake pressure level corresponds to an applied emergency brake.

12. The system of claim 10 wherein said emergency lights are activated when said electronically-operated actuator is not energized.

13. The system of claim 10 wherein said emergency brake comprises an air brake having a brake pipe, said pressure switch coupled to said brake pipe.

14. A system comprising:

a power source;

an electrically-operated solenoid switch;

a pressure switch configured to selectively couple said power source and said electrically-operated solenoid switch, wherein said electrically-operated solenoid switch transitions to a first state when coupled to said power source, and wherein said electrically-operated solenoid switch is configured to couple said power source to an emergency light, for energizing said emergency light, when said electrically-operated solenoid switch is in one of the first state or a second, different state, and to de-couple said power source from said emergency light when said electrically-operated solenoid switch is in the other of the first state or the second state; and a manual reset device configured to control said electrically-operated solenoid switch to the other of the first state or the second state upon receipt of an operator input.

15. A method comprising:

sensing application of an emergency brake of a vehicle by measuring a pressure associated with the emergency brake;

automatically energizing at least one emergency light upon sensing application of the vehicle's emergency brake, wherein said automatically energizing the at least one emergency light upon sensing application of the vehicle's emergency brake comprises de-energizing an electronically-operated solenoid switch through use of a pressure switch configured to selectively couple a power source to the electronically-operated solenoid switch, the electronically-operated solenoid switch configured to couple the supply of power to the at least one emergency light when the electronically-operated solenoid switch is de-energized; and discontinuing a supply of power provided to the at least one emergency light upon at least one of release of the vehicle's emergency brake and receipt of a manual reset input.

16. The method of claim 15 wherein the emergency lighting system further comprises at least one auxiliary light, wherein said automatically energizing the at least one emergency light upon sensing application of the vehicle's emergency brake further comprises automatically energizing the at least one auxiliary light upon sensing application of the vehicle's emergency brake.

* * * * *